US012412419B2

United States Patent
Aminian et al.

(10) Patent No.: US 12,412,419 B2
(45) Date of Patent: Sep. 9, 2025

(54) TRACKING UNIQUE FACE IDENTITIES IN VIDEOS

(71) Applicant: ADOBE INC., San Jose, CA (US)

(72) Inventors: Ali Aminian, Piedmont, CA (US); Aashish Kumar Misraa, Santa Clara, CA (US); Kshitiz Garg, Santa Clara, CA (US); Aseem Agarwala, Seattle, WA (US)

(73) Assignee: ADOBE INC., San Jose, CA (US)

( * ) Notice: Subject to any disclaimer, the term of this patent is extended or adjusted under 35 U.S.C. 154(b) by 388 days.

(21) Appl. No.: 17/981,985

(22) Filed: Nov. 7, 2022

(65) Prior Publication Data

US 2024/0153303 A1    May 9, 2024

(51) Int. Cl.
*G06V 40/16* (2022.01)
*G06T 7/20* (2017.01)
(Continued)

(52) U.S. Cl.
CPC .............. *G06V 40/161* (2022.01); *G06T 7/20* (2013.01); *G06V 10/30* (2022.01); *G06V 10/762* (2022.01);
(Continued)

(58) Field of Classification Search
CPC ...... G06V 40/16; G06V 40/18; G06V 40/161; G06V 10/30; G06V 10/762; G06V 20/40; G06V 20/49; G06V 40/171; G06V 2201/07; G06V 10/763; G06V 20/41; G06V 10/62; G06V 40/173; G06T 7/20;
(Continued)

(56) References Cited

U.S. PATENT DOCUMENTS 8,213,689 B2 *   7/2012   Yagnik ................... G06F 18/28
                                                          382/118
9,471,675 B2 *  10/2016   Galleguillos ......... G06F 16/784
                          (Continued)

FOREIGN PATENT DOCUMENTS

CN        111783641 A  * 10/2020  ......... G06K 9/00268
CN        115019360 A  *  9/2022

OTHER PUBLICATIONS

Zheng, Jingxiao, et al. "An automatic system for unconstrained video-based face recognition." IEEE Transactions on Biometrics, Behavior, and Identity Science 2.3 (2020): 194-209. (Year: 2020).*

(Continued)

*Primary Examiner* — Stephen R Koziol
*Assistant Examiner* — Benedict E Lee
(74) *Attorney, Agent, or Firm* — Shook Hardy & Bacon L.L.P.

(57) ABSTRACT

Some aspects of the technology described herein perform identity identification on faces in a video. Object tracking is performed on detected faces in frames of a video to generate tracklets. Each tracklet comprises a sequence of consecutive frames in which each frame includes a detected face for a person. The tracklets are clustered using face feature vectors for detected faces of each tracklet to generate a plurality of clusters. Information is stored in an identity datastore, including a first identifier for a first identity in association with an indication of frames from tracklets in a first cluster from the plurality of clusters.

20 Claims, 9 Drawing Sheets

(51) Int. Cl.
*G06V 10/30* (2022.01)
*G06V 10/762* (2022.01)
*G06V 20/40* (2022.01)

(52) U.S. Cl.
CPC ............ *G06V 20/49* (2022.01); *G06V 40/171* (2022.01); *G06T 2207/30201* (2013.01); *G06V 2201/07* (2022.01)

(58) Field of Classification Search
CPC .......... G06T 2207/30201; G06T 7/246; H04N 19/43; H04N 19/51
See application file for complete search history.

(56) References Cited

U.S. PATENT DOCUMENTS

| | | | |
|---|---|---|---|
| 9,852,364 B2* | 12/2017 | Liu | G06V 10/806 |
| 10,643,074 B1* | 5/2020 | McAninly | G06N 20/10 |
| 10,922,529 B2* | 2/2021 | Liang | G06V 40/171 |
| 10,997,395 B2* | 5/2021 | Olgiati | G06T 7/20 |
| 11,048,919 B1* | 6/2021 | Modolo | G06V 20/40 |
| 11,544,964 B2* | 1/2023 | Wang | G06V 10/7715 |
| 11,763,566 B2* | 9/2023 | Lee | G06T 7/248 382/103 |
| 12,148,245 B2* | 11/2024 | Xiong | G06V 10/776 |
| 12,175,752 B2* | 12/2024 | Xiong | G06V 20/46 |
| 2019/0065833 A1* | 2/2019 | Wang | G06V 20/46 |
| 2020/0401791 A1* | 12/2020 | Gao | G06V 10/774 |
| 2021/0055737 A1* | 2/2021 | Saleem | G06V 10/82 |
| 2021/0303870 A1* | 9/2021 | Yang | G06V 10/82 |
| 2024/0062560 A1* | 2/2024 | Long | G06V 30/19107 |
| 2024/0087365 A1* | 3/2024 | Pylvaenaeinen | G06V 10/762 |
| 2024/0135571 A1* | 4/2024 | Kelcey | G06V 10/25 |

OTHER PUBLICATIONS

Ye, Mang, et al. "Deep learning for person re-identification: A survey and outlook." IEEE transactions on pattern analysis and machine intelligence 44.6 (2021): 2872-2893. (Year: 2021).*

Chen, Jun-Cheng, et al. "An end-to-end system for unconstrained face verification with deep convolutional neural networks." Proceedings of the IEEE international conference on computer vision workshops. 2015. (Year: 2015).*

* cited by examiner 302
304A  306A  308A  304B  306B
'a': [(1, (10, 10, 20, 35), [0.042, 0.003, 0.102, 0.62 , 0.175, 0.001, 0.059]), (2, (15, 15, 30, 40),
[0.032, 0.013, 0.02, 0.82 , 0.15, 0.001, 0.019])],
308B 'b': [(2, (20, 20, 35, 31), [0.154, 0.009, 0.167, 0.044, 0.434, 0.003, 0.19 ]), (3, (20, 30, 10, 10),
[0.151, 0.006, 0.107, 0.024, 0.734, 0.003, 0.19 ])], 'c': [(7, (30, 30, 30, 30), [0.02 , 0.001, 0.028, 0.315, 0.127, 0.001, 0.509]), (8, (120, 140, 18, 21),
[0.02, 0.001, 0.028, 0.315, 0.127, 0.001, 0.509]), (9, (110, 150, 20, 30), [0.02 , 0.001, 0.028,
0.315, 0.127, 0.001, 0.509])]

TRACKING UNIQUE FACE IDENTITIES IN VIDEOS

BACKGROUND

Identity identification and tracking for videos involves identifying when different individuals appear in the videos and associating each individual with a unique identity. Tracking unique identities in a video or across multiple videos is a fundamental task in video processing. The ability to robustly and efficiently identify and track different identities in videos powers various downstream applications, such as video search and video editing. For instance, identity identification for a video supports users searching for segments of the video where a particular individual is present.

SUMMARY

Some aspects of the present technology relate to, among other things, identity identification from faces in videos. In accordance with some configurations, face detection is performed on frames of a video to detect faces. Features are extracted from detected faces to generate a face feature vector for each detected face. Object tracking is performed on the video using the detected faces to generates tracklets. Each tracking comprises a sequence of consecutive frames with a detected face corresponding to a particular person. The tracklets are grouped into clusters based on face feature vectors for detected faces from each tracklet. In some aspects, face feature vectors for detected faces determined to be noisy (e.g., blurry faces, occluded faces, poorly-illuminated faces, side faces, etc.) are not used when clustering the tracklets. An identity is associated with each cluster, and identity information is stored. The identity information associates an identifier for each identity with frames from tracklets in a cluster corresponding to each identity.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 3 is a diagram showing identity records with identity as primary key in accordance with some implementations of the present disclosure;

FIG. 4 is a diagram showing identity records for a video with frame as primary key in accordance with some implementations of the present disclosure;

DETAILED DESCRIPTION

Overview

Figure 1:
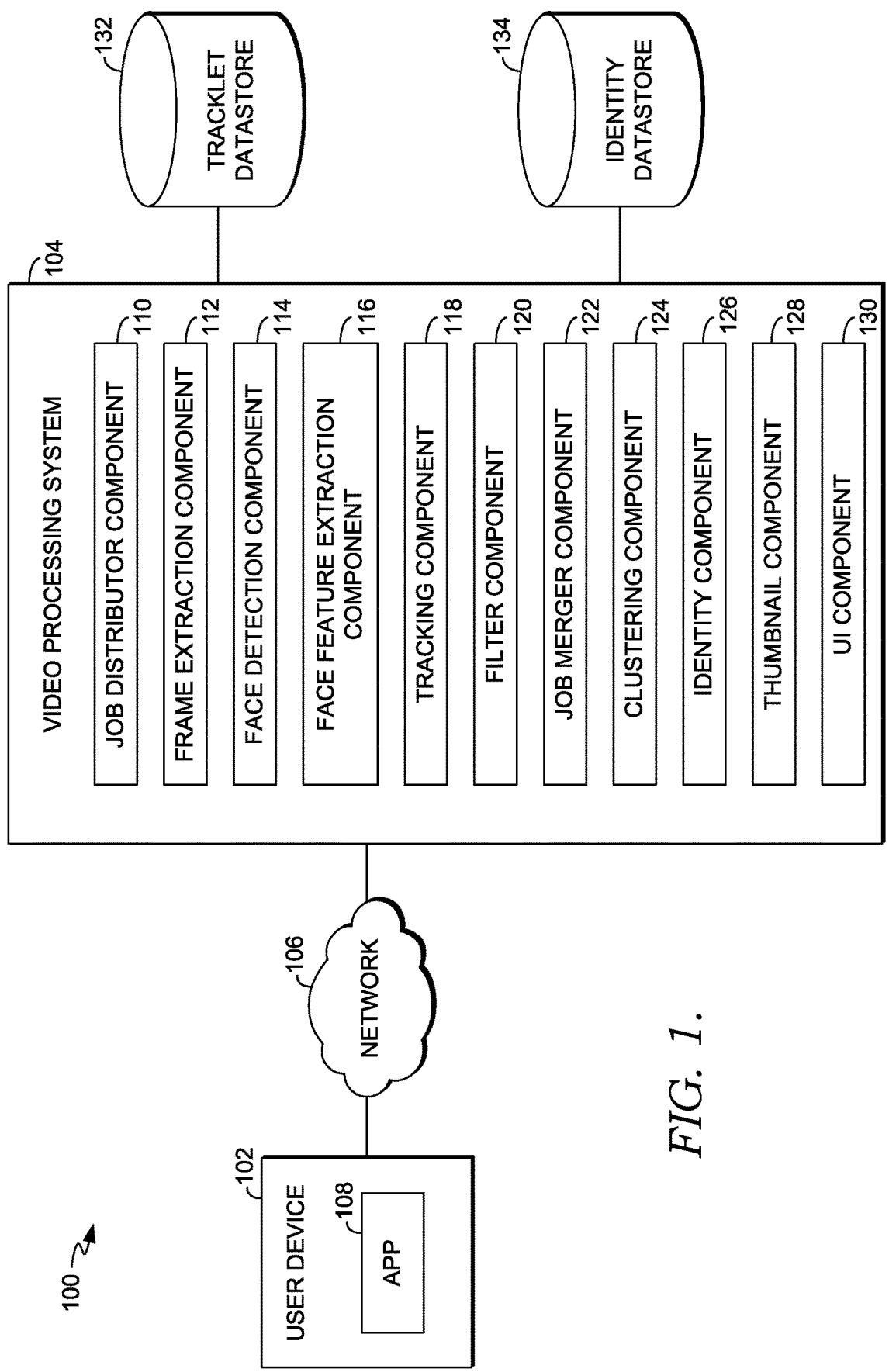
FIG. 1 is a block diagram illustrating an exemplary system in accordance with some implementations of the present disclosure.

A number of challenges impact the performance of systems to accurately and efficiently track identities for videos. One issue is that individuals appear, disappear, and reappear throughout a video. A person disappearing from a video has to be given the same identity by the system when that person reappears in the video. In some cases, the person could have a drastically different appearance at different portions of the video (e.g., beard/aging in a movie), increasing the difficulty for the system to identify the person throughout the video as the same identity. Other challenges with identity tracking for videos include blur (i.e., blurry faces due to the motion of the subject and/or camera), occlusions (i.e., partial/full occlusions of individuals' faces), and lighting (i.e., faces viewed under different lighting conditions might appear very different). Face orientation can also pose a difficulty as a side-view of a person's face is very different from the front view of the same person from a machine learning system perspective. Unusual face poses make it difficult for machine learning systems to robustly track an identity. Further, processing videos is inherently expensive, both in terms of computing cost and speed (i.e., latency), especially in the case of longer videos.

Conventional systems for tracking identities in videos fail to adequately address these challenges. For instance, image-based video face recognition and set-based video face recognition approaches don't take into account the rich temporal information available from videos, which makes the results from such systems inconsistent. Sequence-based video face recognition approaches use descriptors that are complex in design, difficult in measurement, and limited in generality. This makes such systems complex, unscalable, inefficient, and difficult to distribute computation. As a result, conventional systems often provide substandard performance with respect to accurately tracking identities across videos and are computationally inefficient with respect to computing resource requirements and latency.

Aspects of the technology described herein improve the functioning of the computer itself in light of these shortcomings in existing technologies by providing a system that robustly and efficiently tracks unique identities across a video or multiple videos. The system employs object tracking that leverages temporal information from videos to track individuals over segments of the videos, referred to herein as tracklets. After generating tracklets, the system clusters the tracklets into various clusters using face feature vectors for faces in frames of each tracklet. The clustering facilitates associating various occurrences of each individual throughout a video with a unique identity. In some cases, filtering is performed prior to and/or during clustering to remove some face feature vectors (e.g., noisy face feature vectors) and thereby improve performance.

More particularly, in accordance with some aspects of the technology described herein, a video (or multiple videos) is received for processing. In some cases, the video is broken in video segments to facilitate parallel processing of the video segments. Frames are extracted from the video (or a video segment), and face detection is performed on each frame to detect a location of any face in each frame. Additionally, face feature extraction is performed to generate a face feature vector for each detected face in each frame. Tracklets are generated using an object tracker on the detected faces. The object tracker uses locations of detected faces in frames to identity movement of a person's face across consecutive frames. In some cases, the object tracker leverages face feature vectors to improve performance of identifying consecutive frames with a particular person's face. Each tracklet provided by the object tracker identifies a sequence of frames. The tracklet can also identify a location of a detected face (e.g., bounding box coordinates) in each frame and a face feature vector for each detected face (or for a portion of the detected faces).

Clustering is performed on the tracklets using the face feature vectors for detected faces in frames of each tracklet. In some cases, all face feature vectors for a given tracklet are employed for clustering. In other cases, only a portion of the face feature vectors for a given tracklet are used, for instance, by filtering certain face feature vectors from clustering of tracklets. For example, some aspects identify detected faces that are noisy in the sense that the detected faces are lower quality (e.g., blurry, occluded, poor lighting, non-forward face pose, etc.) such that their face feature vectors create noise when clustering. As such, the face feature vectors for detected faces identified as noisy are filtered from tracklets for clustering purposes.

Each cluster of tracklets corresponds with a unique identity, and identity information is stored in an identity database based on the clusters. The identity information associates an identifier of a unique identity with frames of tracklets from a corresponding cluster. As such, the identity information identifies frames of a video in which each unique identity is present. The identity information can include further information, such as a location of a face (e.g., bounding box coordinates) in each frame and/or face information for each face (e.g., face quality, emotion, etc.). In some aspects, a thumbnail is generated and assigned to each identity. A thumbnail for a given entity can be generated by obtaining cropped face images from frames with the identity, scoring the cropped face images, and selecting a cropped face image as a thumbnail for the identity based on the scores.

Aspects of the technology described herein provide a number of improvements over existing technologies. For instance, the technology described herein combines object tracking with clustering to provide accurate identity identification (i.e., detected faces associated with a given identity are from the same person; and only one identity is provided for each person) while reducing latency (i.e., time it takes to process a video for identity identification). The use of object tracking to generate tracklets facilitates accurately identifying faces from a series of consecutive frames as corresponding to the same identity even when some faces from the series of consecutive frames are noisy. The use of clustering leverages face feature vectors from a collection of detected faces in tracklets, thereby associating different portions of the video (i.e., different tracklets) with the same identity. Removal of face feature vectors for some faces (e.g., noisy faces) improves performance (e.g., by removing noise from clustering) and latency (faster processing as noisy face feature vectors removed). The framework employed by some aspects further improves latency by allowing for parallel processing of video segments for certain tasks of the pipeline.

Example System for Tracking Unique Face Identities in Videos

With reference now to the drawings, FIG. 1 is a block diagram illustrating an exemplary system 100 for identifying unique identities from faces in a video in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and a video processing system 104. Each of the user device 102 and video processing system 104 shown in FIG. 1 can comprise one or more computer devices, such as the computing device 900 of FIG. 9, discussed below. As shown in FIG. 1, the user device 102 and the video processing system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of client devices and server devices can be employed within the system 100 within the scope of the present technology. Each can comprise a single device or multiple devices cooperating in a distributed environment. For instance, the video processing system 104 could be provided by multiple server devices collectively providing the functionality of the video processing system 104 as described herein. Additionally, other components not shown can also be included within the network environment.

The user device 102 can be a client device on the client-side of operating environment 100, while the video processing system 104 can be on the server-side of operating environment 100. The video processing system 104 can comprise server-side software designed to work in conjunction with client-side software on the user device 102 so as to implement any combination of the features and functionalities discussed in the present disclosure. For instance, the user device 102 can include an application 108 for interacting with the video processing system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the video processing system 104 remain as separate entities. While the operating environment 100 illustrates a configuration in a networked environment with a separate user device and video processing system, it should be understood that other configurations can be employed in which components are combined. For instance, in some configurations, a user device can also provide capabilities of the technology described herein.

The user device 102 can comprise any type of computing device capable of use by a user. For example, in one aspect, the user device can be the type of computing device 900 described in relation to FIG. 9 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user can be associated with the user device 102 and can interact with the video processing system 104 via the user device 102.

At a high level, the video processing system 104 processes a video or multiple videos to identify faces in the video(s) and associate the faces with unique identities. Throughout the description, when reference is made to processing a video, it should be understood that the process can involve a single video or multiple videos. As shown in FIG. 1, the video processing system 104 includes a job distributor component 110, a frame extraction component 112, a face detection component 114, a face feature extraction component 116, a tracking component 118, a filter component 120, a job merger component 122, a clustering component 124, an identity component 126, a thumbnail component 128, and a user interface component 130. The components of the video processing system 104 can be in addition to other components that provide further additional functions beyond the features described herein. The video processing system 104 can be implemented using one or more server devices, one or more platforms with corresponding application programming interfaces, cloud infrastructure, and the like. While the video processing system 104 is shown separate from the user device 102 in the configuration of FIG. 1, it should be understood that in other configurations, some or all of the functions of the video processing system 104 can be provided on the user device 102.

In one aspect, the functions performed by components of the video processing system 104 are associated with one or more applications, services, or routines. In particular, such applications, services, or routines can operate on one or more user devices, servers, can be distributed across one or more user devices and servers, or be implemented in the cloud. Moreover, in some aspects, these components of the video processing system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

As previously noted, the video processing system 104 processes a video provided to the system to identify faces in the video and associate the faces with different unique identities. In some configurations, the video processing system 104 processes video segments in parallel to improve the overall speed of the system, thereby reducing the time needed to identity unique identities in the videos. The job distributor component 110 breaks a video into different video segments and distributes the video segments to different resources for processing the video segments in parallel. Each video segment corresponds with a portion of a video comprising a certain length of time or frames. The size of each video segment is configurable. For instance, the job distributor component 110 could break a one-hour video into three 20-minute segments, six 10-minute video segments, ten 6-minute segments, or sixty 1-minute segments. In some cases, the size of the time segments is uniform. In other cases, the size of the time segments is non-uniform. The job distributor component 110 can use various heuristics to determine the size of the segments. For instance, the job distributor component 110 could determine the size of the time segments based on the overall length of the video, the size of the video file, or the type of video (e.g., some types of videos may have less faces). As another example, the job distributor component 110 could generate longer and/or shorter video segments for portions of the video with no human faces in comparison to the length of video segments for portions of the video with human faces.

The job distributor component 110 can segment a video for parallel processing at various stages in different configurations. In particular, some processes could be performed on an un-segmented video while other processes are performed on a segmented video. In some cases, the job distributor component 110 could segment a video multiple times. For instance, the job distributor component 110 could break a video into a first set of video segments and distribute the first set of video segments to resources for a first process, and the job distributor component 110 could re-segment the video after the first process to provide a second set of video segments with different sizes than the first set and distribute the second set of video segments to a second process. In further aspects, the job distributor component 110 is not employed and an un-segmented video is processed.

The frame extraction component 112 extracts frames from a video (or video segment). In some cases, the frame extraction component 112 extracts all frames. In other cases, the frame extraction component 112 extracts only a portion of the frames. For instance, the frame extraction component 112 could extract every Nth frame. This facilitates quicker processing of the video by reducing the number of frames being processed. The portion of frames extracted from the video can be configurable.

The face detection component 114 processes each frame to detect any faces in the frame. In some aspects, the face detection component 114 detects a presence of a face in a frame without identifying the face (e.g., assigning a unique identity to the face). The face detection component 114, in some configurations, provides a bounding box for each face. As used herein, a bounding box comprises any set of coordinates or other information identifying a location of the face on a frame. The face detection component 114 can employ any of a variety of different techniques for face detection. In some configurations, the face detection component 114 uses a machine learning model (e.g., a neural network model), such as the RetinaFace model, to detect faces in frames.

The face feature extraction component 116 extracts features for each detected face to provide a face feature vector for each detected face. A face feature vector for a detected face comprises a collection of features extracted for the face by the face feature extraction component 116. Although the term vector is used, a face feature vector can include a collection of features in any format and is not limited to an array. The face feature extraction component 116 can employ any of a variety of different techniques for feature extraction from faces. In some configurations, the face feature extraction component 116 uses a machine learning model (e.g., a neural network model), such as the InsightFace model, to extract features from faces.

The tracking component 118 employs an object tracker to identify detected faces in consecutive frames as likely corresponding to same person. The object tracker generates tracklets, in which each tracklet includes a series of consecutive frames with a particular face. For instance, if a person enters a video at frame 100 and exits the video at frame 200, the tracklet would include frames 100 through 200. As used herein, consecutive frames can refer to consecutive frames in a video (e.g., frame 1, frame 2, frame 3, etc.). As used herein, consecutive frames can also refer to consecutive frames from a video that are processed by the tracking component 118 (e.g., frame 1, 6, 11, etc. if every fifth frame is processed).

The object tracker employed by the tracking component 118 uses motion to track movement of a face from frame to frame. In some aspects, the object tracker employs bounding boxes around faces provided by the face detection component 114 to identify movement of bounding boxes from frame to frame. In some aspects, the object tracker employs face feature vectors determined for faces by the face feature extraction component 116 in conjunction with bounding boxes as the face feature vectors provide rich signals to improve performance of identifying a particular face across consecutive frames. The object tracker can employ any of a variety of different techniques for tracking a face across consecutive frames. For instance, in some aspects, the object tracker employs a Kalman filer and matching cascade. In some configurations, the face feature extraction component 116 uses a machine learning model (e.g., a neural network model), such as the DeepSORT model, to track faces across consecutive frames.

As noted above, the tracking component 118 provides a number of tracklets. A given tracklet comprises a sequence of consecutive frames for a given face based on movement of detected faces from frame to frame. For instance, suppose a first frame includes only one bounding box for a first face, a second frame includes a bounding box for the first face and a bounding box for a second face, a third frame includes a bounding box for the first face and a bounding box for the second face, and a fourth frame includes only one bounding box for the second face. In this example, the tracking component 118 generates a first tracklet comprising the first, second, and third frames, and also generates a second tracklet comprising the second, third, and fourth frames.

In some aspects, each tracklet is associated with a bounding box for each frame (as provided by the face detection component 114). For instance using the example above, the first tracklet could include an indication of the bounding boxes for the first face in the first, second, and third frames, while the second tracklet could include an indication of the bounding boxes for the second face in the second, third, and fourth frames. In some aspects, each tracklet is associated with a face feature vector for each frame (as provided by the face feature extraction component 116). Continuing the example above, the first tracklet could include an indication of the face feature vectors for the first face in the first, second, and third frames, while the second tracklet could include an indication of the face feature vectors for the second face in the second, third, and fourth frames.

In some aspects, the tracking component 118 can employ scene change information (e.g., using the Shortcut application) when generating tracklets to improve accuracy of results. Scene change information identifies frames in a video when changes in scenes occur. The scene change information can be used by the tracking component 118 when generating tracklets by terminating tracklets at the end of scenes (i.e., when at least one face is present at the end of the scene) and beginning tracklets at the beginning of scenes (i.e., when at least one face is present at the beginning of the scene).

The filter component 120 comprises one or more filters to remove certain face feature vectors from consideration during subsequent clustering by the clustering component 124 (as will be described in further detail below). In some aspects, the filter component 120 comprises one or more noise filters to remove noisy face feature vectors. A noisy face feature vector is one generated from a face that is noisy as the face is of lower quality or otherwise less visible in the frame. Noisy faces include, for instance, blurry faces (e.g., during fast motion or when not in focus), faces occluded by other objects, dark faces (e.g., poor lighting), and faces turned from the camera (e.g., side faces). The filter component 120 identifies noisy faces and removes the face feature vectors for the noisy faces from consideration by the clustering component 124.

The filter component 120 can identify noisy faces in a variety of different manners within the scope of the technology described herein. In some configurations, the filter component 120 identifies noisy faces using a face detection model different from a face detection model used by the face detection component 114. For instance, the face detection component 114 could use a first model that provides higher performance face detection than a second model used by the filter component 120. As such, the first model is better able to detect faces than the second model (e.g., the first model is able to detect low quality faces while the second model is unable to detect low quality faces). As such, the filter component 120 identifies as a noisy face any face detected by the first model that is not also detected by the second model.

In some aspects, the filter component 120 identifies noisy faces that are blurred using a Laplacian kernel. In some aspects, the filter component 120 identifies noisy faces based on face pose (e.g., identifying side faces). The filter component 120 can determine face pose in a number of different manners. For instance, the filter component 120 can use landmarks on a given face (e.g., provided by the face detection component 114 or the face feature extraction component 116) to determine the face pose for that face. The filter component 120 identifies as noisy any face with a face pose that doesn't provide a threshold extent of the face. The threshold extent of face can be configurable in various aspects of the technology described herein. Landmark information could also be used to identify occluded faces (e.g., some landmarks hidden by another object).

In still further configurations, the filter component 120 can identify noisy faces before generating face feature vectors by face feature extraction component 116. In such configurations, the face feature extraction component 116 can generate face feature vectors for detected faces that are not identified as noisy by the filter component 120.

The job merger component 122 receives tracklets and writes the tracklets to a tracklet datastore 132. As discussed above, in some configurations, the job distributor 110 divides a video into video segments and distributes the video segments to different system resources for parallel processing. In such configurations, the job merger component 112 receives tracklets generated for the video segments from the different system resources and stores the information in the tracklet datastore 132. Each tracklet stored in the tracklet datastore 132 can identify a series of frames for the tracklet, a location of a face in each frame (e.g., bounding box coordinates), and one or more face feature vectors. In some cases, the face feature vector for each face from each frame is stored. In some cases, face feature vectors (e.g., noisy face feature vectors) identified by the filter component 120 are not written to the tracklet datastore 132. In other cases, such face feature vectors are written to the tracklet datastore 132 but marked as filtered. In some configurations, a representative face feature vector is generated for a tracklet and stored in the tracklet datastore 132. For instance, an average face feature vector could be generated from the individual face feature vectors for a tracklet. In some cases, the average face feature vector or other representative face feature vector generated for a tracklet is generated after removing face feature vectors identified by the filter component 120. In some configurations, the average face feature vector or other representative face feature vector is generated by sampling face feature vectors from the tracklet. For instance, ten percent of the face feature vectors for a tracklet could be used to generate the representative face feature vector for the tracklet.

The clustering component 124 clusters tracklets from the tracklet datastore 132 into various groups or clusters based on the face feature vectors for the tracklets. In this way, tracklets that correspond to a same person based on similar face feature vectors are grouped together in a cluster, thereby facilitating identifying all frames throughout a video that correspond with each person.

Any of a variety of different clustering techniques could be employed by the clustering component 124 to cluster tracklets. For instance, the clustering component 124 can employ the density-based spatial clustering of applications with noise (DBSCAN) clustering algorithm, although a variety of other clustering algorithms can be employed. In some configurations, the clustering is performed using all face feature vectors (or a sampling of face feature vectors) with noisy face features removed. In other configurations, the clustering is performed using an average face feature vector or other representative face feature vector for each tracklet.

In some aspects, the clustering component 124 performs adaptive pruning of face feature vectors during clustering. For instance, a long video with many sets of face feature vectors can be difficult to process quickly. To decrease latency, adaptive pruning can be used to reduce the number of face feature vectors used for clustering.

The clustering component 124 can also employ one or more heuristics during clustering and/or as a post-processing step. Each heuristic controls aspects of the clustering. By way of example and not limitation, a heuristic could be used that dictates that a cluster with a single tracklet (or otherwise below a threshold number of tracklets) is disregarded or combined with another closest cluster (e.g., if the two clusters are within some distance threshold) as it is unlikely to have a single tracklet (or otherwise low number of tracklets) for an identity. In some cases, temporal information can be employed. For instance, a heuristic could dictate that two tracklets with overlapping frames are not clustered together.

In some cases, clustering can be performed not only on face feature vectors of tracklets for the video (or group of videos) currently ingested for processing but also on face vectors from previously-processed videos. For instance, frames of the current video can be associated with an existing identity from one or more previously-processed videos. This provides for identification of unique identities across a collection of videos. As such, each unique identity can identify occurrence of a person in all videos.

The identity component 126 stores identity information in the identity datastore 134. The identity information associates unique identities with frames at which the faces of the unique identities occur. The association between unique identities and frames is based on the clustering from the clustering component 124. In some aspects, an identifier for a unique identity is associated with each cluster. As such, for each identity, the frames of tracklets for a given cluster are associated with the identifier for the identity.

The identity information can include further information, such as locations of faces (e.g., bounding box coordinates) and/or face information. In some aspects, the face information can be based on the face feature vectors generated by the face feature extraction component 116. In other aspects, the face information can be independent of those face feature vectors. For instance, the face information can include a quality score that indicates a quality of a face image (e.g., whether the face is blurry, whether eyes are closed, face pose/orientation, illumination). The quality score can be generated, for instance, using a machine learning model trained to generate a quality score given a face image as input. As another example, the face information can include one or more emotion scores that reflect a likely emotion exhibited by the face. For instance, given a face, a trained machine learning model could be used to generate a series of emotion scores that each correspond to a likelihood of a particular emotion being exhibited by the face (e.g., angry, disgust, fear, happy, sad, surprise, neutral).

The identity component 126 stores identity information in one or more formats in accordance with various aspects of the present technology. FIGS. 3 and 4 provide examples of two record formats for storing identity information. In particular, FIG. 3 provides an example of identity records in which each identity record corresponds with a given identity. An identity record includes an identifier for the identity as the primary key and indicates frames at which the identity occurs. The identity record can include additional information, such as location of a face in each frame and face information for each face. For instance, the first record in FIG. 3 includes an identifier 302 for a first identity, a first frame 304A at which a first face of the first identity is present, a first bounding box 306A identifying a location of the first face of the first identity in the first frame 304A, and face information 308A (a vector in this example) for the first face of the first identity. The first record also includes a second frame 304B at which a second face of the first identity is present, a second bounding box 306B identifying a location of the second face of the first identity in the second frame 304B, and face information 308B (a vector in this example) for the second face of the first identity.

FIG. 4 provides an example of frame records in which each frame record corresponds with a given frame. A frame record includes a frame as the primary key and indicates identities present in the frame. The frame record can include additional information, such as location of face(s) in the frame and face information for each face. For instance, the first record in FIG. 4 includes an indication of a frame 402, an identifier 404 for a first identity present in the frame 402, a first bounding box 406 identifying a location of the face of the first identity in the frame 402, and face information 408 (a vector in this example) for the face of the first identity in the frame 402. Although only a single face is included in the first frame in the example of FIG. 4, a frame can include faces for multiple identities (see, e.g., the second frame in FIG. 4)

The identity information stored in the identity datastore 134 can be used for any of a number of downstream applications and task. By way of example only and not limitation, the identity information can be used for: searching the video for certain identities, video editing based on entities (e.g., generate clips for certain identities), associating identities with dialogue (e.g., audio from the video or text generated from the audio), as well as other applications.

Some aspects of the technology described herein employ a thumbnail component 128 to associate a thumbnail with each unique identity. For a given identity, the thumbnail component 128 obtains a cropped image of faces for the identity. The cropped face images can be obtained using the face location (e.g., bounding boxes coordinates) for each frame identified for the identity. The thumbnail component 128 generates a score for each cropped face image. The score for cropped face images can be based on any of a variety of different factors in accordance with various aspects of the technology described herein. By way of example only and not limitation, in some aspects, the score for a cropped face image comprises a face quality score based on the quality of the face in the cropped image. This could be based on, for instance, whether the face is blurry, whether eyes are closed, face pose/orientation, illumination. The face quality score can be generated, for instance, using a machine learning model trained to generate a quality score given a face image as input. As another example, the score for a cropped face image comprises one or more emotion scores that reflect a likely emotion exhibited by the face in the cropped face image. For instance, given a face in a cropped face image, a trained machine learning model could be used to generate a series of emotion scores that each correspond to a likelihood of a particular emotion being exhibited by the face (e.g., angry, disgust, fear, happy, sad, surprise, neutral).

The thumbnail component 128 selects a cropped image for a given identity based on the scores for the various cropped face images for that identity. The selected cropped face image is then stored (e.g., in the identity datastore 134) in association with the identifier of the identity. The selected cropped face image can be used as a representative thumbnail for that identity (e.g., as part of other downstream applications/tasks).

The user interface component 130 of the video processing system 104 provides one or more user interfaces for interacting with the video processing system 104. For instance, the user interface component 130 can provide user interfaces to a user device, such as the user device 102, that are presented on the user device 102 using the application 108. Among other things, the user interfaces provided by the user interface component 130 can enable a user to interact with the video processing system 104 to provide one or more videos as input for the video processing system 104 to identify unique identities in the video(s) and generate identity information as described hereinabove. The user interface component 130 can also provide user interfaces with user interface elements allowing a user to control any configurable aspects of the identity identification process performed by the video processing system. The user interface component 130 can further provide user interfaces that enable downstream applications/tasks based on the identified identities (e.g., searching for identities, video editing, etc.).

Figure 2:
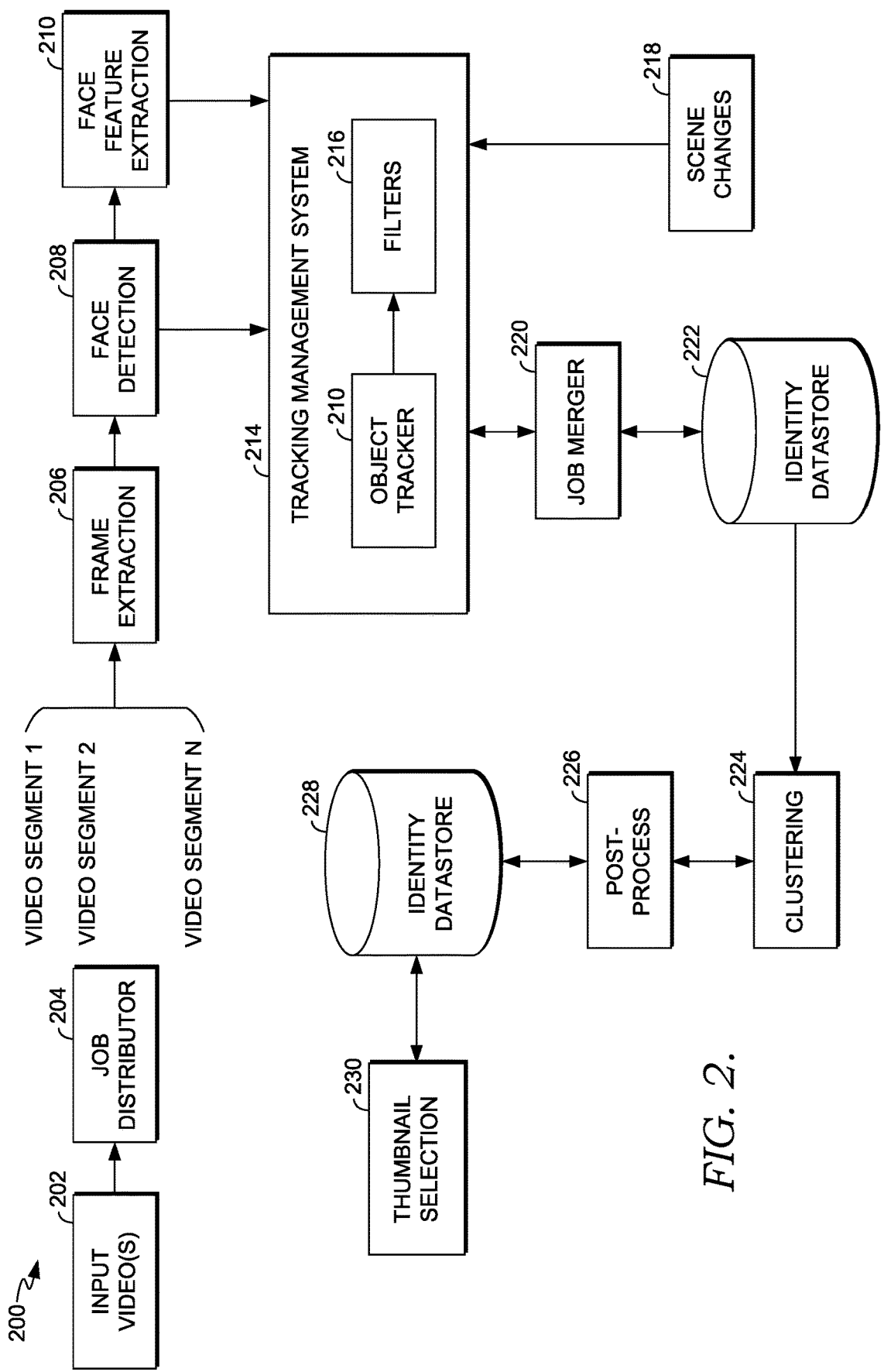
FIG. 2 is a diagram illustrating a pipeline for identifying faces in a video and associating the faces with identities in accordance with some implementations of the present disclosure.

FIG. 2 provides a diagram illustrating an example pipeline 200 for identifying faces in a video and associating the faces with identities. The pipeline 200 can employ, for instance, components of the system 100 described above with reference to FIG. 1. As shown in FIG. 2, a video 202 (or multiple videos) is received for processing. A job distributor 204 breaks the video (or multiple videos) into various video segments and distributes the video segments to different system resources for parallel processing.

For a given segment, frame extraction 206 is performed to extract frames of the video segment. Face detection 208 is performed (e.g., using a face detection machine learning model) on each frame to detect any faces in the frame. Additionally, face feature extraction 210 is performed (e.g., using a face feature extraction machine learning model) to extract a face feature vector for each detected face.

A tracking management system 212 generates tracklets using the detected faces and the face feature vectors for the detected faces. As shown in FIG. 2, an object tracker 214 employs the location of detected faces in frames to identity sequences of consecutive frames that likely contain the face of a particular person. In some aspects, the object tracker 214 also employs face feature vectors to identify detected faces in consecutive frames that likely correspond to a particular person. Filters 214 are employed to remove certain face feature vectors. For instance, noise filters can be employed to remove face feature vectors of noisy faces, such as blurry faces, occluded faces, poorly-lit faces, and side faces. As shown in FIG. 2, scene change information 218 is also employed to generate the tracklets by ending and/or beginning certain tracklets based on scene changes.

A job merger 220 stores tracklets to a tracklet datastore 222. Each tracklet is associated with a sequence of frames and a face feature vector of a detected face for at least a portion of the frames (and/or a representative face feature vector generated from at least a portion of the face feature vectors for the tracklet). Clustering 224 is performed to group tracklets from the tracklet datastore 222 into clusters based on face feature vectors associated with the tracklets. Post-processing heuristics 226 are applied to clusters. Each tracklet is associated with a unique identity based on the clusters. Identity information is stored in an identity datastore 228 that associates an identifier for each unique identifier with frames of tracklets from a cluster associated with each unique identifier. Additionally, thumbnail selection 230 is performed to assign a thumbnail to each unique identity.

Example Methods for Tracking Unique Face Identities in Videos

Figure 5:
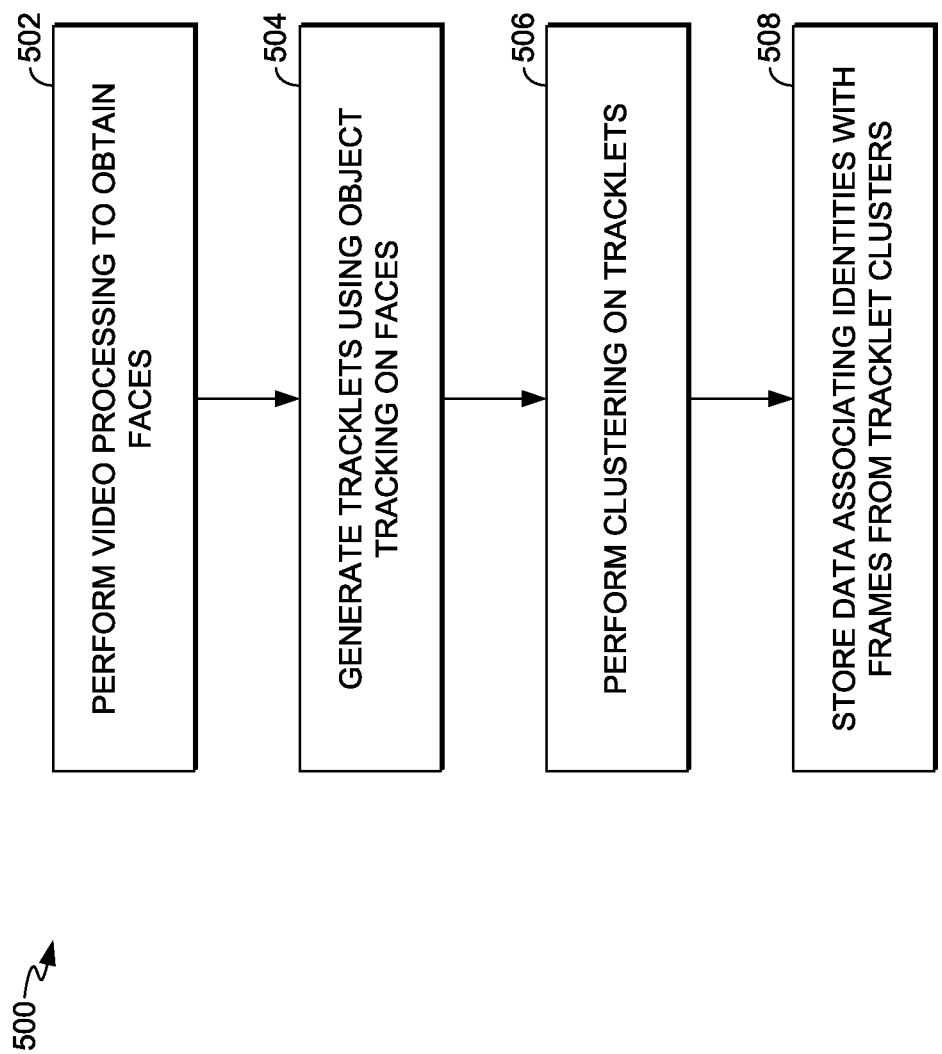
FIG. 5 is a flow diagram showing a method for identifying unique identities from faces in a video in accordance with some implementations of the present disclosure.

With reference now to FIG. 5, a flow diagram is provided that illustrates a method 500 for identifying unique identities from faces in a video. The method 500 can be performed, for instance, by the video processing system 104 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, initial video processing is performed on a video to obtain faces from the video. The initial video processing at block 502 can be performed, for instance, using the method 600 of FIG. 6. Although the method 500 and other methods are described herein with reference to a video, the methods apply to processing multiple videos. Additionally, as noted above, in some configurations, a video is broken into segments and various portions of the methods described herein are performed on video segments (as opposed to an entire video), thereby allowing for parallel processing.

As shown at block 504, tracklets are generated using object tracking on faces obtained by the initial video processing performed at block 502. The tracklets can be generated, for instance, using the method 700 of FIG. 7. Each tracklet comprises a sequences of consecutive frames from the video that contain detected faces that likely correspond with a same identity. Each tracklet can identity a series of frames and a face feature vector for a detected face from at least some of the frames.

Clustering is performed on the tracklets to generate clusters of tracklets, as shown at block 506. The clustering is performed using face feature vectors of the tracklets. In some aspects, all face feature vectors associated with each tracklet is employed. In some aspects, clustering is performed after filtering some face feature vectors (e.g., noisy face feature vectors). Adaptive pruning of face feature vectors can also be employed to reduce latency. In further aspects, clustering is performed using a representative face feature vector for each tracklet, such as an average face feature vector generated for each tracklet using all or a portion of the face feature vectors for the tracklet.

As shown at block 508, identity information is stored based on the clustering. The identity information includes data associating identifiers for unique identities with frames from tracklet clusters. Generally, each cluster is associated with a given identity such that an identifier for an identity is associated with frames from tracklets in a corresponding cluster. For instance, an identifier for a first identity is associated with frames from tracklets in a first cluster, an identifier for a second identity is associated with frames from tracklets in a second cluster, etc. The identity information can include additional information, such as locations (e.g., bounding box coordinates) of faces on frames and face information (e.g., quality scores, emotion scores, etc.).

Figure 6:
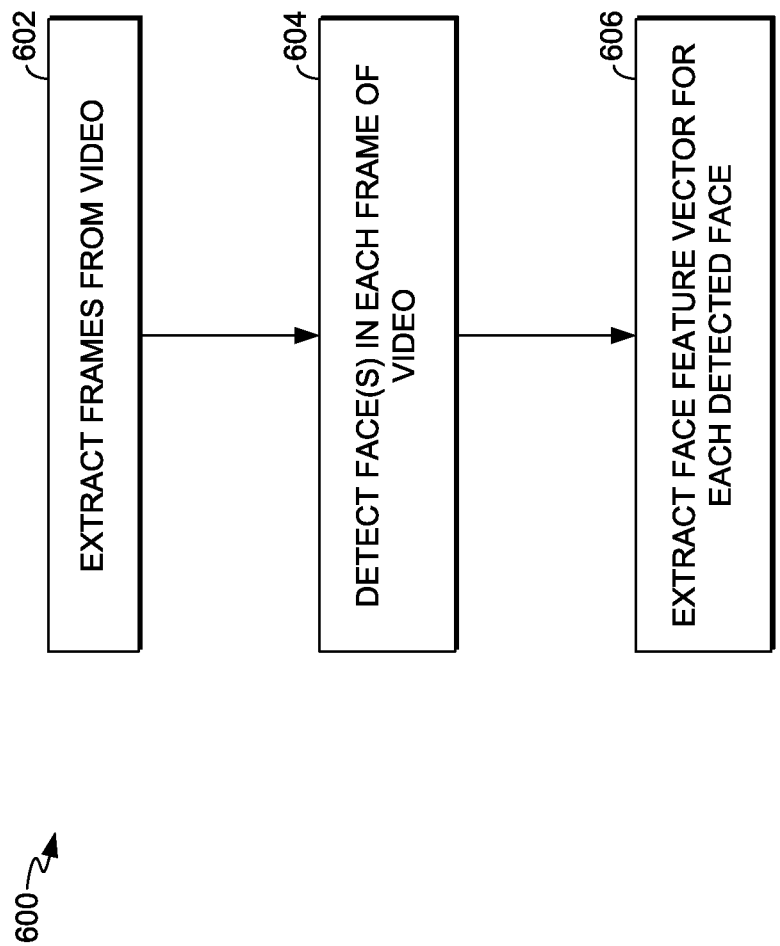
FIG. 6 is a flow diagram showing a method for initial processing of a video to obtain faces from the video in accordance with some implementations of the present disclosure.

Turning now to FIG. 6, a flow diagram is provided showing a method 600 for processing of a video to obtain faces from the video. As shown at block 602, frames are extracted from the video. Face detection is performed on each frame to detect any faces in each frame, as shown at block 604. In some aspects, the face detection is performed using a machine learning model, such as the RetinaFace model. Face detection can provide an indication of a location (e.g., bounding box coordinates) within a frame for each detected face. As shown at block 606, a face feature vector is extracted for each detected face. In some aspects, the face feature extraction is performed using another machine learning model, such as the InsightFace model.

Figure 7:
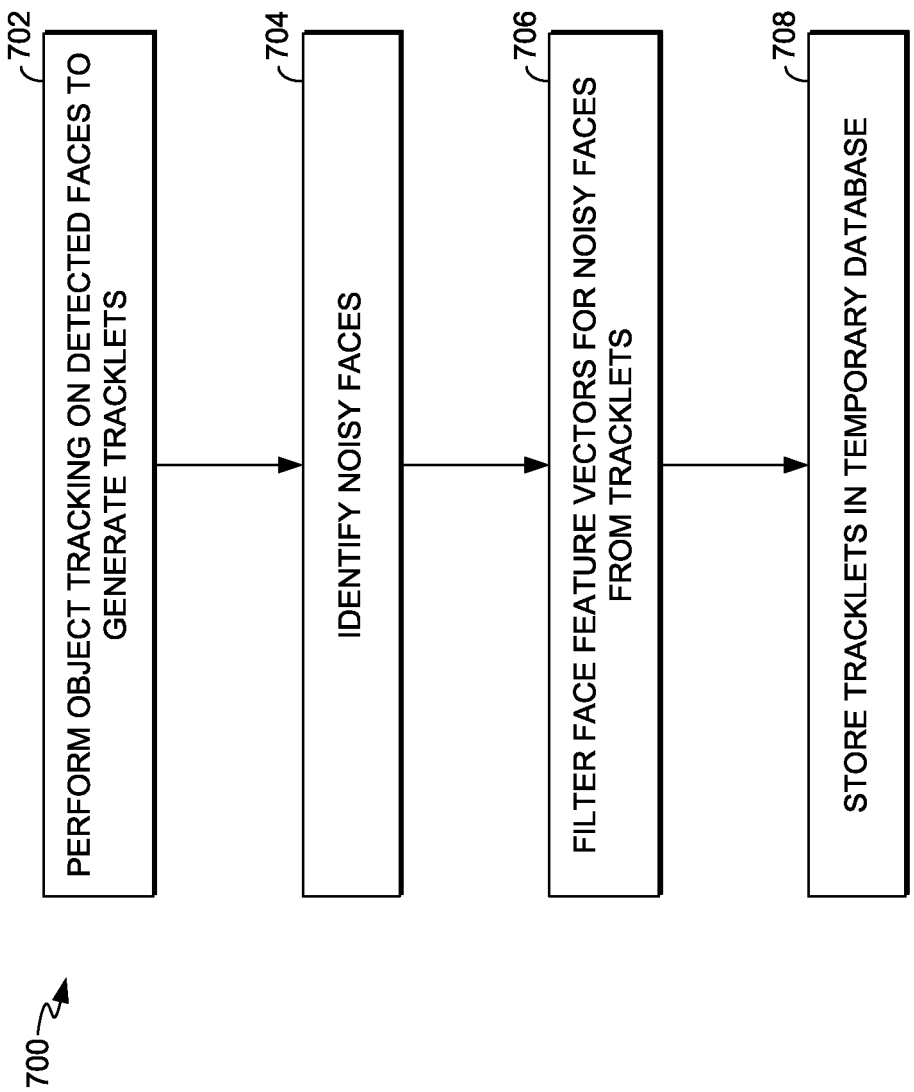
FIG. 7 is a flow diagram showing a method for generating tracklets for a video in accordance with some implementations of the present disclosure.

FIG. 7 provides a flow diagram showing a method 700 for generating tracklets with face feature vectors filtered for noise. As shown at block 702, object tracking is performed on detected faces to generate tracklets. The object tracking can employ another machine learning model, such as the DeepSORT model, to track movement of a given face across consecutive frames. The model employs locations of detected faces (e.g., bounding box coordinates) to determine detected faces in consecutive frames that likely correspond to a given person. In some aspects, the model also employs face feature vectors extracted for detected faces to facilitate identifying detected faces in consecutive frames that likely correspond to a given person.

Noisy faces are identified at block 704. Noisy faces are faces of lower quality or otherwise less visible. Noisy faces include, for instance, blurry faces (e.g., during fast motion or when not in focus), faces occluded by other objects, dark faces (e.g., poor lighting), and faces turned from the camera (e.g., side faces). Noisy faces can be identified in a variety of different manners within the scope of the technology described herein. By way of example only and not limitation, noisy faces are identified in some configurations using a second face detection model different from a first face detection model used to initially identify detected faces for the video. The second face detection model could be configured to provide lower performance than the first face detection model such that faces identified by the first face detection model but not the second face detection model are identified as noisy faces. In some aspects, noisy faces that are blurred are identified using a Laplacian kernel. In some aspects, noisy faces are identified based on face pose (e.g., identifying side faces), for instance, using landmark information on faces. Landmark information could also be used to identify occluded faces (e.g., some landmarks hidden by another object).

As shown at block 706, face feature vectors for noisy faces (i.e., noisy face feature vectors) are filtered from tracklets. The tracklets (with any noisy face feature vectors removed) are stored in a tracklet datastore, as shown at block 708. Each tracklet can identify a series of frames and face feature vectors from those frames that haven't been filtered (and/or a representative face feature vectors based on face feature vectors from those frames that haven't been filtered)

Figure 8:
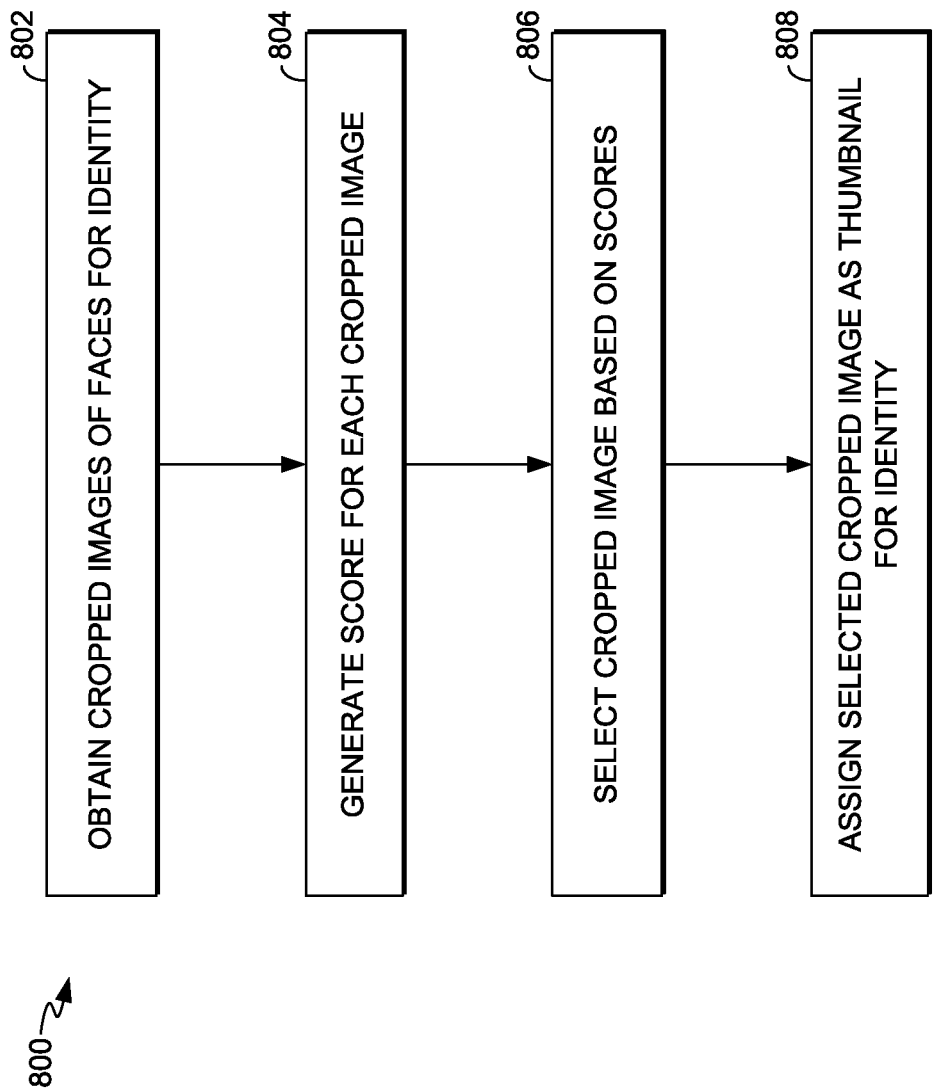
FIG. 8 is a flow diagram showing a method for selecting a thumbnail for an identity in accordance with some implementations of the present disclosure.

With reference now to FIG. 8, a flow diagram is provided that illustrates a method 800 for selecting a thumbnail for a unique identity. As shown at block 802, cropped face images are obtained for an identity. The cropped face images can be obtained, for instance, using the location (e.g., bounding box coordinates) for each frame associated with the identity. A score is generated for each cropped face image, as shown at block 804. The score for each cropped face image can be based on a variety of different faces, such as the quality of the face in the cropped face image and/or emotion determined for the face in the cropped face image. A cropped face image is selected based on the scores, as shown at block 806. The selected cropped face image is associated with the identity as a thumbnail for the identity, as shown at block 808.

Exemplary Operating Environment

Figure 9:
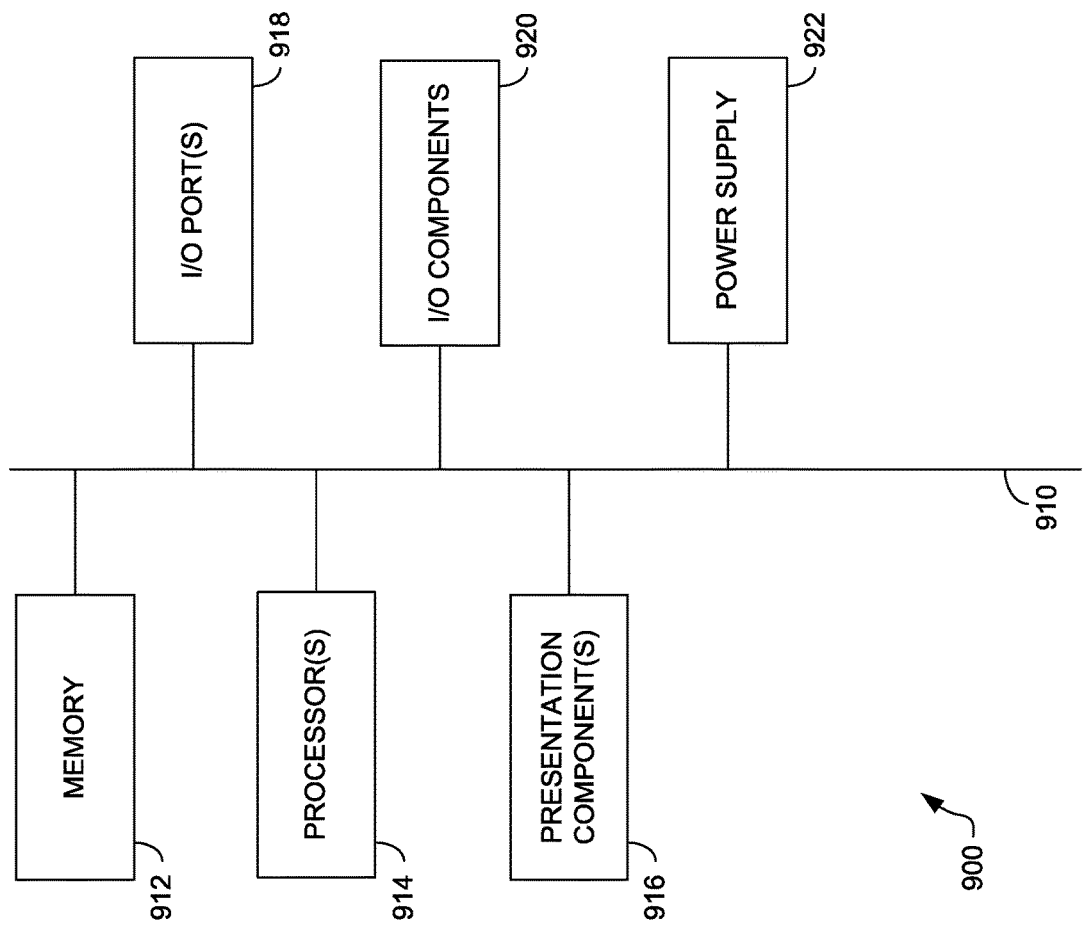
FIG. 9 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 9 in particular, an exemplary operating environment for implementing embodiments of the present technology is shown and designated generally as computing device 900. Computing device 900 is but one example of a suitable computing environment and is not intended to suggest any limitation as to the scope of use or functionality of the technology. Neither should the computing device 900 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what can be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory can be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which can be built in. Illustrative components include a microphone, joystick, game pad, satellite dish, scanner, printer, wireless device, etc. The I/O components 920 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 can be equipped with depth cameras, such as, stereoscopic camera systems, infrared camera systems, RGB camera systems, and combinations of these for gesture detection and recognition. Additionally, the computing device 900 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment.

The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
   generating a plurality of tracklets from a video by performing object tracking on detected faces in frames of the video using locations of detected faces in frames to identity movement of each person's face across consecutive frames in the video, each tracklet comprising a sequence of consecutive frames in which each frame includes a detected face for a person;
   clustering the tracklets using a representative face feature vector for detected faces of each tracklet to generate a plurality of clusters; and
   storing, in an identity datastore, information comprising a first identifier for a first identity in association with an indication of frames from tracklets in a first cluster from the plurality of clusters.

2. The one or more computer storage media of claim 1, wherein the operations further comprise:
   identifying a first detected face as noisy; and
   filtering the face feature vector for the first detected face prior to clustering the tracklets into the plurality of clusters.

3. The one or more computer storage media of claim 2, wherein the plurality of detected faces are identified using a first face detection model, and wherein identifying the first detected face as noisy comprises:
   performing face detection on the frames of the video using a second face detection model; and
   determining the first detected face is not detected by the second face detection model.

4. The one or more computer storage media of claim 2, wherein identifying the first detected face as noisy comprises:
   identifying the first face as blurry using a Laplacian kernel.

5. The one or more computer storage media of claim 2, wherein identifying the first detected face as noisy comprises:
   identifying the first face as a side face using one or more landmarks for the first face.

6. The one or more computer storage media of claim 1, wherein the object tracking uses the face feature vectors to generate the plurality of tracklets.

7. The one or more computer storage media of claim 1, wherein the object tracking uses scene change information to generate the plurality of tracklets.

8. The one or more computer storage media of claim 1, wherein the operations further comprise:
   determining a first subset of face feature vectors for a first tracklet are associated with the first cluster and a second subset of face feature vectors for the first tracklet are associated with a second cluster;
   dividing the first tracklet into a first sub-tracklet and a second sub-tracklet; and
   grouping the first sub-tracklet with the first cluster and the second sub-tracklet with the second cluster.

9. A computer-implemented method comprising:
   performing face detection to detect faces in frames of a video;
   generating a plurality of tracklets by performing object tracking on the detected faces, each tracklet comprising a sequence of consecutive frames with detected faces corresponding to a person;
   identifying one or more detected faces as noisy;
   clustering the tracklets into a plurality of clusters using face feature vectors for detected faces not identified as noisy; and
   storing, in one or more computer storage media, identity information associating an identifier of a first identity with frames of tracklets from a first cluster.

10. The computer-implemented method of claim 9, wherein the detected faces are detected using a first face detection model, and wherein identifying the one or more detected faces as noisy comprises:
   performing face detection on the frames of the video using a second face detection model; and
   determining the one or more detected faces are not detected by the second face detection model.

11. The computer-implemented method of claim 9, wherein identifying the one or more detected faces as noisy comprises:
    identifying at least one detected face as blurry using a Laplacian kernel.

12. The computer-implemented method of claim 9, wherein identifying the one or more detected faces as noisy comprises:
    identifying at least one detected face as a side face using one or more landmarks for the at least one detected face.

13. The computer-implemented method of claim 9, wherein the one or more detected faces are identified as noisy prior to generating the face feature vectors for the detected faces not identified as noisy.

14. The computer-implemented method of claim 9, wherein the method further comprises:
    dividing the video into a plurality of video segments; and
    wherein the face detection and the object tracking are performed on the video segments in parallel.

15. A computer system comprising:
    one or more processors; and
    one or more computer storage media storing computer-useable instructions that, when used by the one or more processors, causes the one or more processors to perform operations comprising:
    detecting, using a first machine learning model, faces in frames of a video;
    generating, using a second machine learning model, a face feature vector for each detected face;
    performing, using a third machine learning model, object tracking using the detected faces and the face feature vectors to generate a plurality of tracklets, each tracklet comprising a sequence of consecutive frames with detected faces corresponding to a person;
    grouping the tracklets into a plurality of clusters using face feature vectors for detected faces from frames of the tracklets; and
    storing, in an identity datastore, identity information associating each identity of a plurality of identities with frames from tracklets in a corresponding cluster from the plurality of clusters.

16. The computer system of claim 15, wherein the operations further comprise:
    identifying a first detected face as noisy; and
    filtering the face feature vector for the first detected face prior to grouping the tracklets into the plurality of clusters.

17. The computer system of claim 16, wherein the detected faces are detected using a first face detection model, and wherein identifying the first detected face as noisy comprises:
    performing face detection on the frames of the video using a second face detection model; and
    determining the first detected face is not detected by the second face detection model.

18. The computer system of claim 16, wherein identifying the first detected face as noisy comprises:
    identifying the first face as blurry using a Laplacian kernel.

19. The computer system of claim 16, wherein identifying the first detected face as noisy comprises:
    identifying the first face as a side face using one or more landmarks for the first face.

20. The computer system of claim 15, wherein the object tracking uses scene change information to generate the plurality of tracklets.

* * * * *